June 9, 1953 G. M. DUPUY 2,641,485
VALVED PIPE FITTING
Filed July 26, 1949 4 Sheets-Sheet 1
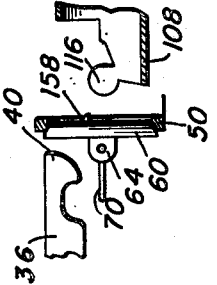
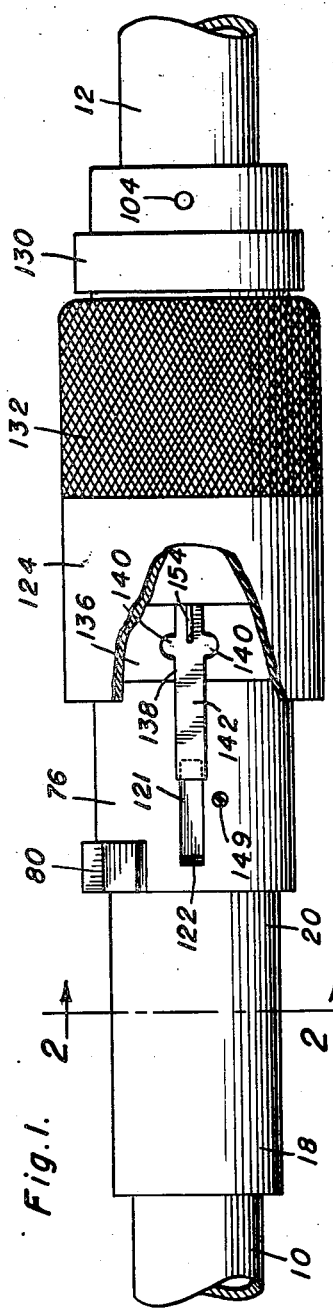
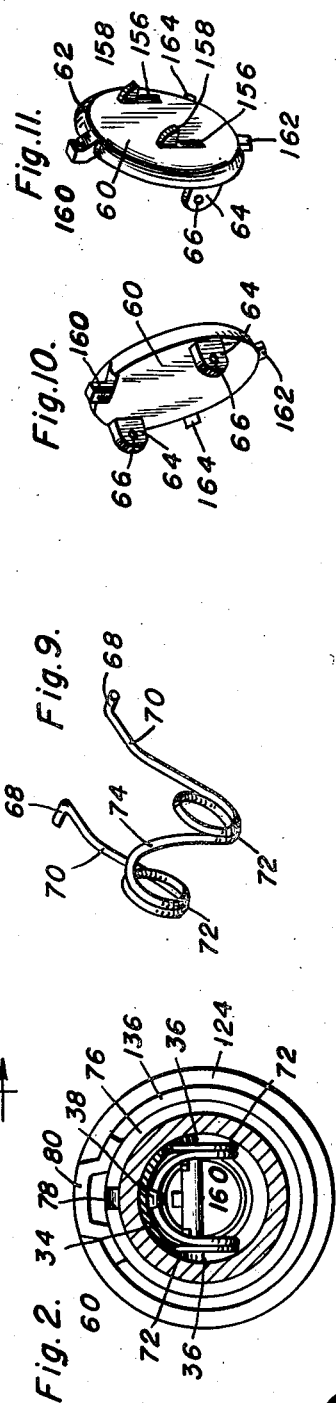
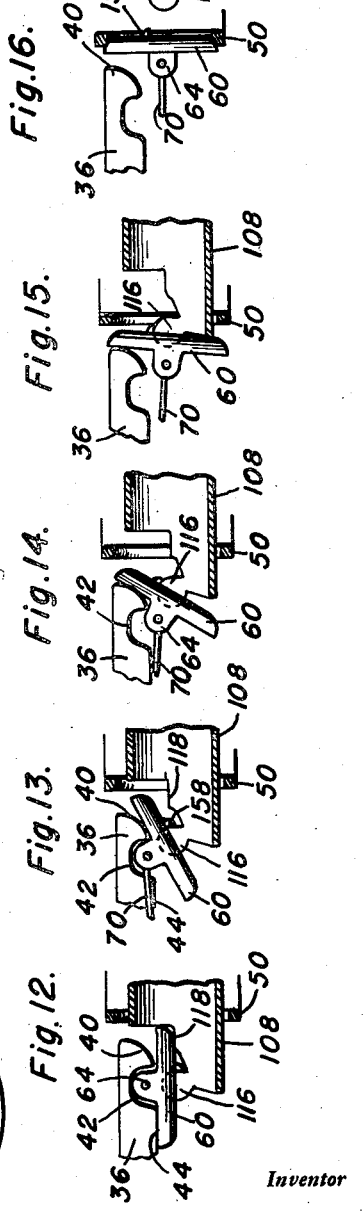
Inventor
Guillaume M. Dupuy
By *Clarence A. O'Brien and Harvey B. Jacobson*
Attorneys

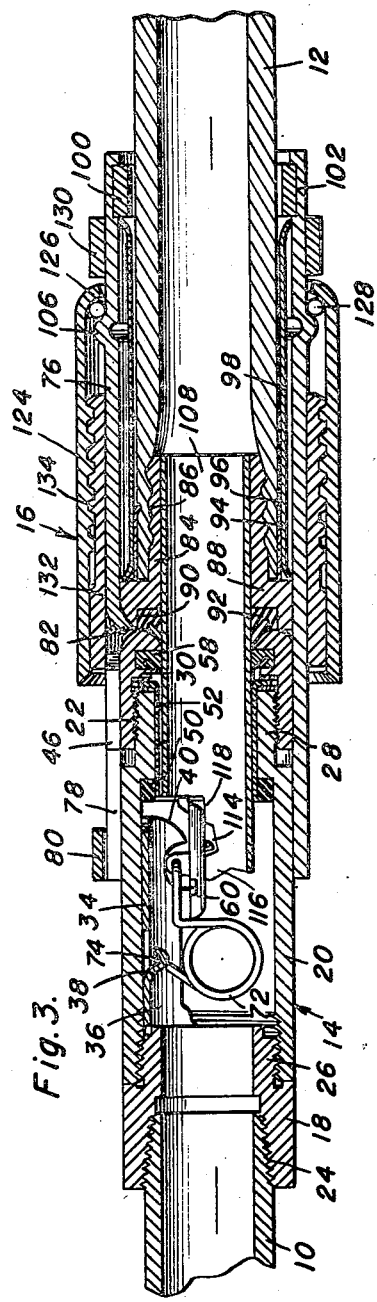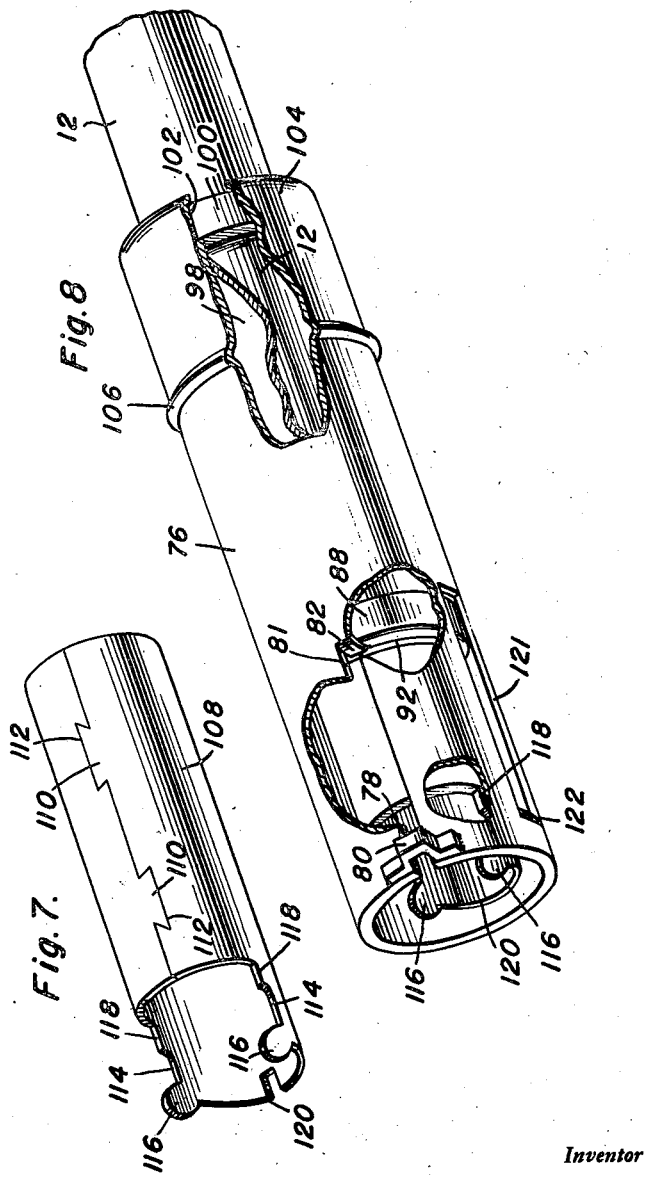

June 9, 1953 G. M. DUPUY 2,641,485
VALVED PIPE FITTING
Filed July 26, 1949 4 Sheets-Sheet 3
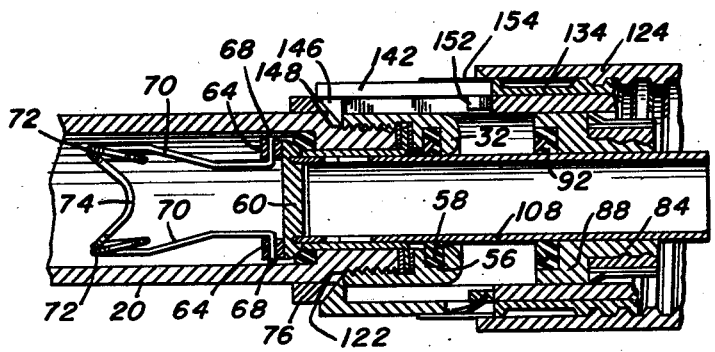
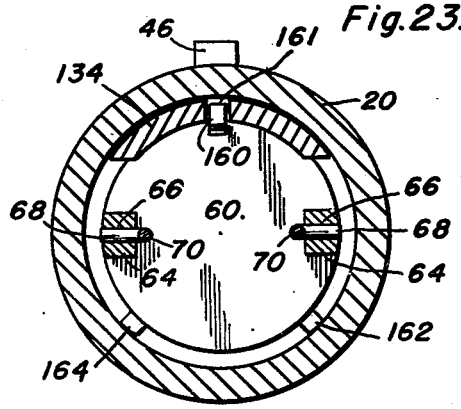
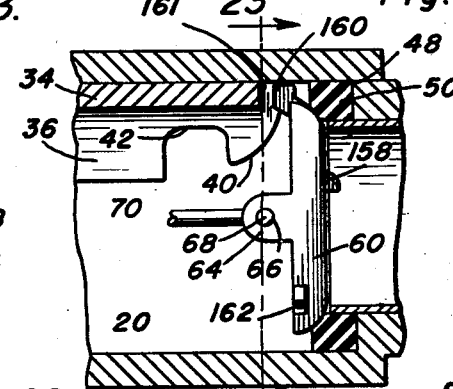
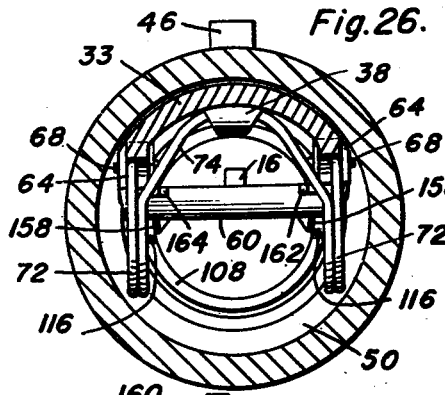
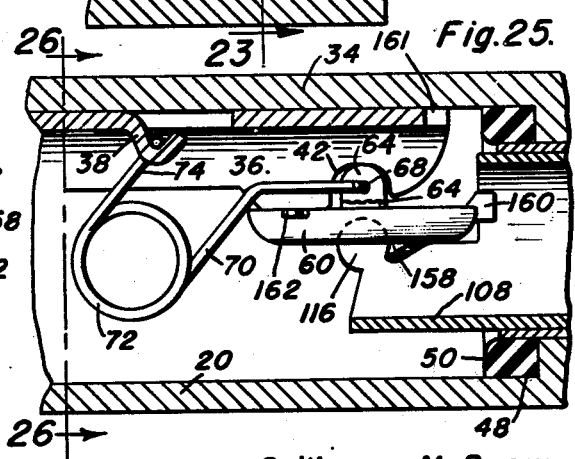
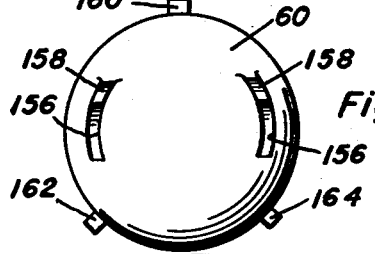
Guillaume M. Dupuy
INVENTOR June 9, 1953  G. M. DUPUY  2,641,485
VALVED PIPE FITTING
Filed July 26, 1949  4 Sheets-Sheet 4
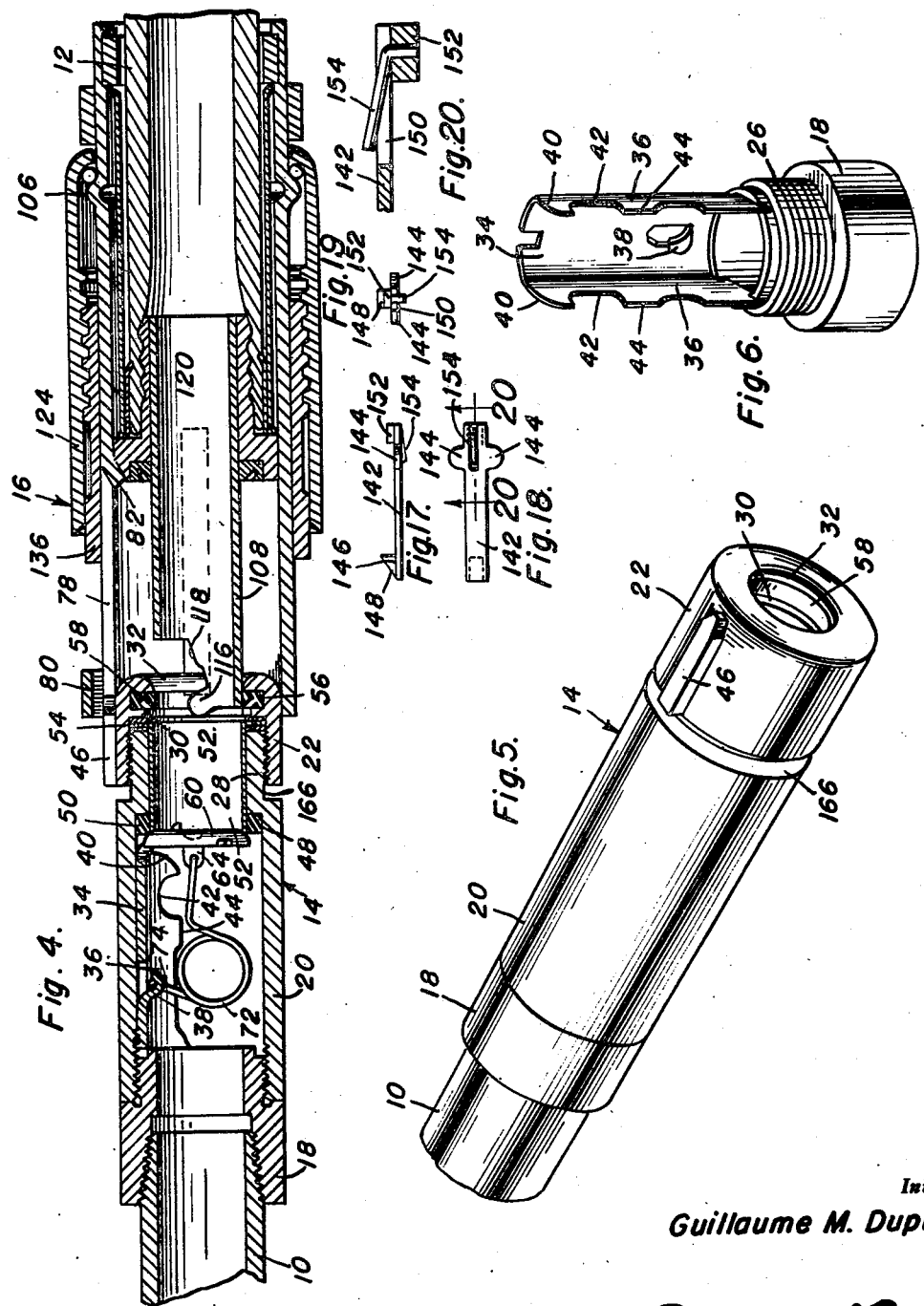
Inventor
Guillaume M. Dupuy Patented June 9, 1953

2,641,485

UNITED STATES PATENT OFFICE 2,641,485

VALVED PIPE FITTING

Guillaume M. Dupuy, Shanghai, China

Application July 26, 1949, Serial No. 106,911

9 Claims. (Cl. 284—18)

This invention comprises novel and useful improvements in a valved pipe fitting and relates generally to a valve assembly for controlling the flow of fluid under pressure through conduits in one direction, and more specifically pertains to a valve assembly and control means particularly adapted for automatically closing pipe outlets and stopping fluid flow therethrough upon disengagement of the couplings with which the valve assembly is associated, for controlling in an improved manner flow past the valve, and for permitting flow past the valve where the flow is from one direction only through the conduit.

The principal object of this invention is to provide an improved flow control valve for conduits which, upon reversal of the normal direction of flow, is automatically opened as a one-way check valve and which is positively opened to various adjusted positions by manually operable means to permit flow in a normal direction.

A further important object of the invention is to provide a valve assembly for controlling flow through conduits wherein the valve has a floating engagement with its seat and with a valve rest, together with a positive connection for preventing complete detachment of the valve from the actuating mechanism during its open position.

A further very important object of the invention is to provide a pipe coupling in which two sections of a valve assembly are associated for automatically seating the valve when the coupling is disconnected, and having provision for manually opening the valve when the coupling is engaged.

Yet another object of the invention is to provide a valve assembly as set forth in the preceding object, wherein convenient means are provided for opening the valve to various extents while the coupling is connected and by a common means controlling the coupling action.

A still further object of the invention is to provide a valve assembly having detachable sections, wherein an improved and highly efficient arrangement of the valve structure and operating mechanism is obtained, wherein the valve assembly is ideally adapted for long life, ease of servicing and repair, is inexpensive in its construction and is of durable but light-weight construction.

These, together with various ancillary features and objects of the invention which will later become apparent as the following description proceeds, are attained by this invention, a preferred embodiment of which has been illustrated, by way of example only, in the accompanying drawings, wherein:

Figure 1 is a side elevational view of a pipe or conduit coupling to which the present invention has been applied, parts being broken away, the coupling being shown in its connected position;

Figure 2 is a vertical transverse sectional view taken substantially upon the plane of the section line 2—2 and showing the arrangement of certain internal parts of the device;

Figure 3 is a vertical, central, longitudinal sectional view taken through the assembly of Figure 1 and showing the coupling connected with the valve in its open position;

Figure 4 is a view similar to Figure 3 but showing the coupling in its unlocked position, with the valve in its seated or closed position;

Figure 5 is a perspective view of the female element of the coupling;

Figure 6 is a perspective view of an element of the male coupling element;

Figure 7 is a perspective view of the valve actuating sleeve forming a portion of the male element of the coupling;

Figure 8 is a perspective view, parts being broken away, of the male coupling element;

Figure 9 is a perspective view of the valve spring;

Figures 10 and 11 are perspective views from opposite sides of the valve;

Figures 12–16 are diagrammatic views, shown in section, and illustrating successive steps in the movement of the valve from its wide open position to its completely closed position as the coupling elements of the male and female members are disengaged;

Figure 17 is a side elevational view of a latch member carried by the male coupling section;

Figure 18 is a top plan view of Figure 17;

Figure 19 is an end elevation, upon an enlarged scale, from the right end of Figure 17;

Figure 20 is a longitudinal enlarged sectional view taken substantially upon the plane of the section line 20—20 of Figure 18;

Figure 21 is a side elevational view of a pipe or conduit and showing the present invention applied thereto, parts being broken away;

Figure 22 is an enlarged detail view of Figure 21 and showing the valve against its seat;

Figure 23 is a transverse vertical sectional view taken substantially on the plane of section line 23—23 of Figure 22;

Figure 24 is an elevational view of the valve per se;

Figure 25 is an enlarged detail view of Figure 3 and with parts of the valve and holder therefor shown in part; and

Figure 26 is a transverse vertical sectional view taken substantially on the plane of section line 26—26 of Figure 25.

Referring now more specifically to the accompanying drawings wherein like numerals designate similar parts throughout the various views, attention is directed first to Figures 1, 3 and 4, which show a suitable assembly in which my novel valve assembly and mechanism may be advantageously employed. In these figures, the numbers 10 and 12 designate, respectively, the upstream and downstream sections of a pipe, hose or conduit which are adapted to be detachably connected with each other by the novel valved fitting forming the subject of this invention. This fitting for connecting these fluid conduit sections includes a female coupling element or assembly, indicated generally by the numeral 14, and shown in its entirety in Figure 5, which cooperates with a male coupling element or assembly indicated generally by the numeral 16 and includes valve regulating and operating mechanism. The female coupling assembly includes detachable sections comprising a rear member 18, a main body portion 20, and a nose member 22.

The rear member 18 of the female assembly may be connected in various desired ways with the conduit section 10, as for example by cooperating screw threads 24 formed upon the engaging outer and inner surfaces of the members 10 and 18, while the rear member 18 may be detachably secured to the main body member 20 as by a screw-threaded engagement of an annularly reduced portion 26 received within the end of the body member 20. The latter, in turn, is preferably annularly reduced to form a tubular boss or sleeve 28 at its other extremity, which is screw-threaded for detachable connection with the interior surface of the nose portion 22, this nose portion having an internal annular flange 30 and a flanged extremity 32 which is centrally apertured to define an opening for receiving a valve operating member and for permitting fluid flow through the assembly as set forth hereinafter.

Received within the internal bore of the body member 20 and disposed in snug engagement therewith is a curved plate 34 having substantially parallel side flanges or walls 36 which, at their outer ends, are suitably attached to the inner or forward end of the reduced portion 26 of the rear member 18, as shown in Figure 6, whereby the plate 34 will be carried by the rear member for insertion or removal therewith from the interior of the body member 20. At a convenient location upon its inner surface, the plate 34 has a downwardly or inwardly struck detent portion 38 which constitutes a seat for anchoring and retaining the valve spring as set forth hereinafter, the side flanges 36 at their forward ends being suitably curved, as at 40, to constitute camming surfaces whose functions will be pointed out hereinafter.

Rearwardly of the camming surfaces 40, the side walls 36 are provided with notched or recessed portions 42, and rearwardly thereof the side walls are provided with flat surfaces 44 constituting rests for receiving the valve in its open position and for limiting the opening movement of the same, shown in Figures 3 and 12 and as pointed out more particularly hereinafter.

Secured in any suitable manner upon the exterior surface of the nose portion 22 is a rigidly attached, longitudinally extending lug 46 which constitutes an indexing key or guide for assisting in assembling the male and female coupling elements in proper rotational relation with respect to each other as set forth hereinafter.

The internal bore of the body member 20 is provided with an annular shoulder or seat 48 where the same meets with the internal bore of the reduced portion 28 thereof, and a valve seat 50 in the form of an annular ring which may be of any desired material, resilient or rigid in nature, is frictionally engaged in the bore against the shoulder 48 and is retained therein by frictional engagement with the inner extremity of a sleeve 52 which is snugly fitted in the bore of the reduced portion 28, and carries or defines upon its outer end an annular seat for a valve as set forth hereinafter.

Upon its other extremity, sleeve 52 is provided with an annular external flange 54 which is clamped between the outer end of the annular reduced portion 28 and the previously mentioned internal flange 30 of the nose 22, by suitable gaskets or packing members, as will be apparent from Figures 3 and 4. Between the internal flange 30 and the terminal flange 32, the nose portion 22 is provided with an annular groove 56 in which is yieldingly retained a resilient annular washer 58.

Floatingly mounted in the body portion 20 for cooperation with the valve seat 50 and the valve supporting plate 34 is a valve which may conveniently be of the disk-type and which is shown particularly in Figures 10 and 11 as a disk or circular plate 60 having on one side an annular, tapered or bevelled edge 62 which is adapted to engage and seat upon the valve seat 50, while the rear surface of the valve disk is provided with oppositely disposed, rearwardly extending spaced lugs 64 which may be conveniently apertured, as at 66, for engagement by the oppositely and outwardly turned laterally disposed terminals 68 (see Figure 9) formed on side arm portions 70 of a coil spring which includes a pair of helical coils 72 at the rear ends of the arms 70, these coils being connected by an integral bowed mid-portion 74 which is adapted to be seated upon the valve spring anchor or detent 38.

It should be here noted that the coils 72 are disposed against the sides of the bore through the body member 20, as will be readily apparent from Figures 2 and 9, so that these coils will not interfere with the flow of fluid through the valved coupling, while the bowed portion 74 likewise is adapted to hug the interior surface of the body member 20, the plate 34, and the side walls 36 thereof to minimize any obstruction to flow through the passages of the coupling. The initial and permanent bias of the spring coils 72 is such as to initially load the valve disk 60 and thereby urge the same tightly against the valve seat 50 in the closed position of the valve, as shown in Figure 4; and also, in the open position shown in Figure 3, yieldingly urge the valve in a clockwise direction to thereby firmly maintain the valve in an open position in a manner more particularly pointed out hereinafter.

The male coupling section includes what may be termed a primary sleeve 76, see also Figure 8, which at its forward end is adapted to telescope over the nose portion 22 and the forward part of the main body portion 20 of the female coupling element, as shown in Figures 3 and 4, and has secured therein, in a detachable manner, the downstream conduit section 12 previously mentioned.

At its forward end, the primary sleeve 76 has a longitudinally extending slot 78 which is adapted to slidingly receive the guide or index lug 46 previously mentioned. The open outer ends of the slot 78 are bridged, as by a U-shaped reinforcing bracket 80, to impart rigidity to the primary sleeve at its slotted extremity. The U-shaped bracket 80 thus provides sufficient clearance to permit the index lug or key 46 to pass therebetween as the index lug moves into the slot 78; and the index member, as well as the U-shaped member 80, offer a convenient means for properly positioning the parts for assembly in the dark.

At its rearward end, the slot 78 is provided with a radially, inwardly extending detent or lug 82 for a purpose to be later set forth.

Received within the interior of the primary sleeve 76 is a nipple 84 which, by means of corrugations 86, or in any other desired manner, has retained thereon the extremity of the downstream conduit section 12, this nipple being spaced from the internal walls of the sleeve 76, but being slidably received therein as by an annular head portion 88 which slidingly engages the internal surface of the sleeve 76, and which, at its outer end, is provided with an annular recess 90 in which is yieldingly received and retained a resilient packing member 92. A sleeve 94 may conveniently be tightly secured to surround the extremity of the conduit 12, and is preferably provided with an annular internal bead 96 received in a suitable annular recess in the outer surface of the conduit 12 whereby the sleeve is rigidly attached thereto. This sleeve constitutes a stop means for limiting relative movement of the conduit 12 toward the head 88 of the nipple, and outward movement of the nipple relative to the primary sleeve 76 is prevented by means of a spacing sleeve 98 terminally engaged with the nipple head 88 and with a spring locking ring 100 seated in an internal annular groove 102 formed at the rear end of the primary sleeve 76.

As shown in Figure 8, the locking ring 100 may be disengaged from its annular seat 102 by means of pressure exerted against the ring through apertures 104 in the sleeve 76 by any suitable tool.

Suitably positioned upon the sleeve 76 is an annular external bead or shoulder 106 forming a bearing race as set forth hereinafter.

The previously mentioned inwardly bent detent 82 at the end of the slot 78 of the primary sleeve 76 constitutes a means which overlies the head portion 88 of the nipple and which will enter an index notch 81 in sleeve 76 and prevents removal of the same from the front end of the primary sleeve. The conduit 12 is thus secured to nipple 84 which, in turn, is detachably clamped in sleeve 76 by the members 82, 98 and 100.

Rigidly secured to and extending through the hollow nipple 84 is a tubular sleeve 108 which may be conveniently formed from a single sheet of metal rolled into sleeve-like form, the edges of this sheet being provided with lugs 110 received in recesses 112 whereby the sheet may be rolled into sleeve-like form and retained in that position. The forward end of this sleeve is cut away to provide oppositely disposed side recesses 114 having arcuately shaped, forwardly projecting lugs 116 forming cam fulcrums and rearwardly extending flat surfaces 118 constituting stops or supports for the valve member. At its lower forward edge, the sleeve 108 is provided with a forwardly projecting nose portion 120 constituting a valve actuating cam as set forth hereinafter.

Suitably located upon its sides, the primary sleeve is provided with longitudinally extending slots 120 having bevelled front ends 122 for a purpose which will later become apparent. Alternately, a single slot could be provided if desired.

The forward end of the sleeve 108 extends considerably forwardly of the nipple head 88 but terminates short of the forward extremity of the primary sleeve 76, whereby this forwardly extending portion may be slidably received through the previously mentioned nose portion 22, and sleeve 52 therein, for engagement and cooperation with the valve member, as will be apparent from Figures 3 and 4 and as set forth hereinafter. Rotatably embracing the primary sleeve 76 is an outer sleeve 124, whose rearward end is inwardly turned or internally flanged, as at 126, for cooperation with the previously mentioned external bead 106 to receive therebetween a plurality of anti-friction elements such as the ball bearings 128. These bearings prevent forward movement of the sleeve 124 relative to the primary sleeve 76, but journal the outer and primary sleeves for relative rotation. Rearward movement is prevented by a collar or sleeve 130 which is rigidly attached to the exterior surface of the sleeve 76 in any suitable manner, this arrangement permitting easy rotation of the outer sleeve 124 upon the primary sleeve 76 but preventing relative longitudinal movement of these sleeves. If desired, a portion of the outer surface of the outer sleeve 124 may be knurled or roughened, as at 132, to provide a convenient finger grip means whereby the outer sleeve may be manipulated.

The outer sleeve is internally threaded for screw-threaded engagement upon corresponding external threads 134 formed upon the exterior surface of an intermediate sleeve 136, which is disposed between the outer and the primary sleeves. The intermediate sleeve, as shown in Figure 1, is provided with a pair of longitudinally extending slots 138 which register with the slots 120 of the primary sleeve 76, the slots 138 having arcuately shaped opposite lateral recesses 140. Latch members, shown in Figures 17, 18, and 20, are adapted for seating in the slots 138 and in the recesses 140, and for sliding movement in the slots 120. This latching member includes an elongated body portion 142 seating in the slot 138 and having laterally extending lugs 144 adapted for engagement in the recessed portions 140, and is provided with a radially inwardly extending hook 146 whose under surface is tapered or inclined, as at 148, to provide a wedge or cam for sliding engagement with the bevelled surface 122. At its rear end, the latching member is provided with a longitudinal slot 150, and a depending guide block 152 is secured in any desired manner to the under surface of the latching member at its rearward end and bridges the slot 150, and has a forwardly and upwardly extending spring member 154 attached to the block 152 and extending upwardly from the surface of the latch member 142.

The thickness of the body portion 142 is substantially equal to that of the intermediate sleeve 136, whereby the laterally extending portions 144 may be received in the recesses 140 without protruding from either the interior or exterior surfaces of the intermediate sleeve 136; while the guide block 152 depending from the latching member 142 is of sufficient thickness to be at all times receivable in the slot 120 of the primary sleeve 76 for sliding movement longitudinally thereof; and the depending hook portion 146 is selectively depressed below the slot 120 to cause the hook 146 to extend inwardly of the inner surface of the primary sleeve 76 to constitute a latch or locking means as set forth hereinafter, and to be selectively lifted through the slot 120 to cause the hook to disengage from its latching position in a manner which will be subsequently apparent.

It should be here noted that the intermediate sleeve 136 is secured to the primary sleeve 76 for longitudinal sliding movement thereon, but is prevented against rotational movement by the engagement of the latch slide blocks 152 and hooks 146 in the slots 120, so that upon rotation of the outer sleeve 124 which is held against longitudinal movement by the races 126, and the stop shoulder 130, the intermediate sleeve will be longitudinally reciprocated relative to the outer and primary sleeves. This reciprocating movement is utilized for the purpose of actuating the latching member 142 for coupling or uncoupling the male and female sections and for actuating the valve operating mechanism.

As will be apparent from Figure 11, the valve member 60 is provided with a pair of arcuate slots 156 which are disposed in parallel relation and are adapted to receive the fulcrum portions 116 of the sleeve 108, and above these recesses the valve has laterally extending lugs or hooks 158 for a purpose to be subsequently set forth.

Likewise formed upon the valve 60 are radially extending lugs or projections 160 disposed in what may be regarded as the top of the valve, and 162 and 164 at the side and bottom of the valve, these lugs constituting guides which engage suitable slots or notches for maintaining the valve in proper rotational position during its opening and closing movements.

From the foregoing, the operation of the valve between its opened and closed positions will now be understood. Starting with the valve in its open position as shown in Figure 3 and in the diagrammatic sketch of Figure 12, it will be apparent that the biasing action of the spring coils 72 will cause the projections 64 of the valve to be seated in the notches 42 of the valve supporting member 34, so that the valve will be pressed by the spring in a clockwise direction of rotation as viewed in Figures 3 and 12 to rest or seat upon the valve supporting surfaces or rests 44 of the supporting member 34, and 118 of the valve operating sleeve 108. Also in this position, the cam supports 116 of the sleeve 108 will be received in the recesses or notches 156, with the hooks or lugs 158 engaged over the cam portions 116. The spring pressure of the valve spring will urge the valve in a clockwise direction to firmly retain the valve in this position, thereby avoiding any tendency to flutter in the event that a pulsating flow of fluid prevailed in the conduit sections 10 and 12.

Assuming now that the couplings connecting the male and female sections are being released, the initial outward movement or disengaging movement of the valve operating sleeve 108, as indicated in Figure 13, is outwardly with respect to the valve seat 50 which is stationarily retained in the female coupling element or section 14, so that the outwardly moving cam lugs 116 will pull against the lugs 158 of the valve 60, thereby causing a counter-clockwise rotation of the valve 60 against the fulcrum defined by the lower forward edge of the recesses 42 which engage the valve lugs 64, resulting in the pivoting action of the valve 60 upon the cam support members 116 aiding the action of the valve spring. Continued withdrawal of the valve operating sleeve, as shown in Figure 14, causes a further pivoting movement of the valve until the surface of the same engages the cam surfaces 40 of the valve supporting member 34, and the valve now moves along these cam surfaces, at the same time rocking upon the support cams 116 as shown in Figure 15. In the position of Figure 15, the valve is almost in its closed position, and substantially fully obstructs the flow through the conduit coupling sections.

Finally, the complete withdrawal of the valve operating sleeve 108 and its cam nose 120 from the valve permits the spring to seat the valve snugly against the valve seat, thereby completely cutting off any flow through the conduit section 10 in the direction of the valve. The valve spring, as well as the pressure of the fluid, will maintain the valve against the seat, thereby preventing any leakage of fluid past the valve after the two sections have been completely uncoupled. This completely valve-closed position is illustrated in Figure 16 as well as in Figure 4.

When it is desired to reconnect the detached fluid conduit sections 10 and 12, the male and female coupling sections or assemblies are brought toward each other, whereby the forward end of the valve operating sleeve 108 is introduced into the orifice 32 of the nose section 22 of the female coupling section, then moved through the sleeve 52 until the edge 120 of the sleeve 108 engages the lower portion of the valve 60, thereby slightly cracking or opening the lower side of the valve from its seat, and permitting a trickle flow past the valve.

Further inward movement of the valve operating sleeve continues to tilt the valve until the cam lugs 116 pass beneath the valve lugs 158 and seat in the recesses 156. The engagement of the cam portions 116 in the recesses 156 provides a pair of fulcrum members about which the valve now commences to pivot.

The valve being continuously moved forward by the advancing valve operating sleeve now is completely removed from its seat, being supported upon at least three points by the two cam portions 116 and by the engagement of the edge 120 therewith, until the position of Figure 15 is attained, at which time the upper edge of the valve contacts the extreme forward end of the cams 40 of the valve supporting member 34. This position, shown in Figure 15, now initiates a rocking action of the valve about the fulcrum cam supports 116, as shown in Figure 14, until the valve lugs 64 begin to seat in the recesses 42, as shown in Figure 13. The final forward movement of the valve operating sleeve now rotates the valve about the cam supports 116 until the fully open position shown in Figure 12 is attained.

It will thus be seen that the action of the valve is floating, the valve being spring-urged against the cam support lugs 116 throughout the opening and closing movements, and this urging action being effected by the cam surfaces 40, the hook members 158, and the recess 42, in cooperation with the lugs 64.

The above mentioned radial guide projections 160, 162, and 164 serve to prevent unintentional rotation of the valve during the periods when the valve is seated on its seat 50.

The operation of the engagement and detachment of the male and female sections of the coupling is as follows. The latching plates or plate 142 which is positioned with its lateral projections 144 received in the lateral recesses 140 of the intermediate sleeve 136 has its spring 154 disposed outwardly of the sleeve 136, while the body portion 142 is flush with the inner and outer surfaces of the sleeve, while the hook portion 146 is positioned to ride in and extend through the slot 120 of the primary sleeve 76, while the guide block 152 extends through the slot 138 and into the aligned slot 120 for guiding and sliding movement therein. Rotation of the outer sleeve 124 now causes the same, by means of the screw-threaded engagement 134, to move the intermediate sleeve 136 non-rotatably but axially or longitudinally, the sleeve 124 covering a portion of the latch 142, its lateral extensions 144 and presses downward upon the spring 154, thereby flexing the member 142 and causing its hook portion 146 to be tensioned inwardly of the sleeve 76.

The primary function of the rotatable outer sleeve 124 is to adjustably advance and retract the valve operating sleeve 108 after the male assembly has been latched to the female assembly by engagement of the latching hook or claw 146 in the annular groove 166 formed by the spaced extremities of the body portion 20 and the nose portion 22. The operation of this portion of the mechanism of the invention is as follows.

The latch member 142, in effect, forms an extension of the intermediate sleeve 136, since the same is of the same thickness as the material of the sleeve, but is detachably associated therewith by means of the engagement of the lateral projections 144 in the lateral recesses 140 of the slot 138.

The width of the latch body 142 is greater than the width of the slot 120 so that the latch body cannot pass therethrough, but the width of the guide block 152 and of the latch hook 146 is such as to enable these members to be slidably received in the slot.

The thickness or height of the guide block 152 is such that the inner end of the same does not extend beyond the inner surface of the primary sleeve 76, but the thickness of the latch 146 is considerably greater, since the same is intended to not only penetrate the slot 120, but to have seating engagement in the annular channel or groove 166 previously mentioned.

The action of the spring 154 serves to yieldingly bias the latch 146 radially inwardly of the slot 120.

It will now be seen that as the outer sleeve 132 is rotated, its threaded engagement with the intermediate sleeve 136 causes the latter, by reason of the keyed engagement of the latch member in the slot 120, to be restricted to longitudinal movement relative to the primary sleeve 76, and thus move the latch member forwardly or rearwardly in the groove 120. When the intermediate sleeve and latch member are moved to their forwardmost positions, the bevelled or cam edge 148 on the latch 146 engages the bevelled surface 122 at the end of the slot 120, thereby moving the latch member radially outwardly from the slot 120, so that the latch portion 146 will completely clear or be withdrawn radially outwardly from the inner surface of the primary sleeve 76, so that the latter may be slid to telescopically engage the nose portion 22 of the female coupling member, thereby permitting the keying action of the lug 46 with the slot 78, which in turn prevents any rotation of the primary sleeve 76 with regard to the female coupling section 14. The male and female members are then slid together until such time as the forward end 120 of the valve opening sleeve 108 engages the valve, at which time the resistance encountered by the engagement with the spring loaded and fluid pressure loaded valve 60 stops further inward movement. At this time, the outer sleeve 124 may be rotated in the reverse direction, thereby retracting the latch member 142 in the slot 120, until such time as the latch portion 146 thereof slides down off of the inclined surface 142 and under the bias of its spring 154 now penetrates into seated engagement in the annular channel 166, thereby securely coupling the male and female sections together. This coupling action can only be released by again rotating the outer sleeve 124 forwardly, to force the latching member 146 up the incline 122, to thereby cause disengagement of the latch 146.

With the latch 146 now seated in the annular groove 166, the rotation of the outer sleeve 124 retracting the latch within the slot 120 serves now to draw the entire male assembly forwardly, since the latch member and consequently the intermediate sleeve to which it is attached, are now locked with respect to the female member. During this forward sliding movement of the male assembly, it will be seen that the indexing or guiding lug 46 will slide in the previously mentioned guiding slot 78, and during this sliding movement the valve operating sleeve 108 will actuate the valve as aforementioned. This forward movement is positively limited first by the cushioning action of the abutment of the nose cap 20 with the gasket 92 carried by the crown 88 of the male section, and then positively by the mechanical abutment of the nose 22 with the extremity of the crown 88.

From the foregoing, the construction and operation of the invention will be now understood, and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

It should be observed that the lug 160, constituting a top lug, will enter an index notch or slot 161 in the curved plate 34 and the lugs 162 and 164 cooperate with the lug 160 to limit rotational and radial displacement of the valve while the valve is disposed against its seat 50.

Means is provided for limiting the forward motion of the intermediate sleeve 136 and this means comprises a stop lug 149 mounted on and projecting outwardly from the outer periphery of the sleeve 76, as shown in Figure 1.

Having thus disclosed and described the invention, what is claimed as new is as follows:

1. A valved coupling assembly comprising first and second conduit sections, means releasably connecting said sections together, a valve, a valve support and valve seat mounted in said first section, a valve operating means carried by the second section and engaged with said valve for moving the same from its seat when said sections are connected, said valve support including an elongated plate, cams on said plate engaging said valve for rocking the same upon movement from its seat, valve support surfaces on said plate for supporting said valve and limiting its opening movement.

2. In a valved coupling assembly having a detachable conduit section, a flow control valve assembly mounted in said section comprising: a valve seat and a valve support in said section, a valve engaged with said seat, a valve seating spring yieldingly urging the valve towards the seat and floatingly mounting the valve on the support, said valve support including an elongated plate, cams on said plate engaging said valve for rocking the same upon movement from its seat, valve suport surfaces on said plate for supporting said valve and limiting its opening movement.

3. A valved coupling assembly comprising first and second conduit sections, means releasably connecting said sections together, a valve, a valve support and valve seat mounted in said first section, a valve operating means carried by the second section and engaged with said valve for moving the same from its seat when said sections are connected, common operating means for actuating said first-mentioned means and said last-mentioned means, said valve support including an elongated plate, cams on said plate engaging said valve for rocking the same upon movement from its seat, valve support surfaces on said plate for supporting said valve and limiting its opening movement.

4. A valved coupling assembly comprising first and second conduit sections, means releasably connecting said sections together, a free floating valve, a valve support and valve seat mounted in said first section, a valve operating means carried by the second section and engaged with said valve for moving the same from its seat when said sections are connected, said valve operating means including a tubular sleeve carried by the second section, said sleeve being formed with cam surfaces at one end for initially engaging said valve, cam fulcrums on said sleeve for supporting said valve for and during rocking movement and valve support surfaces for receiving said valve and limiting the opening movement thereof.

5. A valved coupling assembly comprising first and second conduit sections, means releasably connecting said sections together, a valve, a valve support and valve seat mounted in said first section, a valve operating means carried by the second section and engaged with said valve for moving the same from its seat when said sections are connected, common operating means for actuating said first-mentioned means and said last-mentioned means, said first-mentioned means including a locking recess in said first section, a latch slidably mounted on said second section and engaged in said locking recess and latch operating means on said second section, said common operating means including means for moving the valve operating means to adjustably open the valve from its seat after said latch has seated in the locking recess.

6. A valved coupling assembly comprising first and second conduit sections, means releasably connecting said sections together, a valve seat mounted in said first section, a valve supporting member mounted in said first section adjacent said valve seat, a valve, means resiliently connecting said valve to said supporting member and yieldingly urging said valve towards its valve seat, means carried by said second section and movable in said first section for urging said valve from its seat against the resistance of said resilient connecting means, means in said first section for rocking the valve about a diametrical axis therethrough upon movement of the valve from its seat, said movable means having a valve support means for engaging and supporting said valve when the latter has been moved from said valve seat.

7. The combination of claim 6 wherein said supporting member has supporting surfaces engaging the valve and limiting opening movement of the valve by said movable means.

8. The combination of claim 6 including lugs on said valve, said supporting member having recesses receiving said lugs when the valve is moved to open position by said movable means to thereby prevent longitudinal movement of said valve in said first section.

9. The combination of claim 6 wherein said supporting member has supporting surfaces engaging the valve and limiting opening movement of the valve by said movable means including lugs on said valve, said supporting member having recesses receiving said lugs when the valve is moved to open position by said movable means to thereby prevent longitudinal movement of said valve in said first section.

GUILLAUME M. DUPUY.

References Cited in the file of this patent

UNITED STATES PATENTS

| Number | Name | Date |
|---|---|---|
| 706,884 | Beebe | Aug. 12, 1902 |
| 879,880 | Landau | Feb. 25, 1908 |
| 1,115,945 | Kunz | Nov. 3, 1914 |
| 1,818,508 | Scott | Aug. 11, 1931 |
| 2,255,593 | Berger et al. | Sept. 9, 1941 |
| 2,300,483 | Berger et al. | Nov. 3, 1942 |
| 2,453,741 | Bopp | Nov. 16, 1948 |
| 2,492,271 | Cox et al. | Dec. 27, 1949 |